US008326570B2

(12) United States Patent  (10) Patent No.: US 8,326,570 B2
Waite et al.  (45) Date of Patent: Dec. 4, 2012

(54) STEERING WHEEL POSITION SENSOR

(75) Inventors: Daryn L. Waite, Arlington Heights, IL (US); David L. Maloney, Barrington, IL (US)

(73) Assignee: D&R Technologies, L.L.C., Carol Stream, IL (US)

( * ) Notice: Subject to any disclaimer, the term of this patent is extended or adjusted under 35 U.S.C. 154(b) by 608 days.

(21) Appl. No.: 12/442,535

(22) PCT Filed: Sep. 26, 2007

(86) PCT No.: PCT/US2007/079522
§ 371 (c)(1),
(2), (4) Date: Dec. 8, 2009

(87) PCT Pub. No.: WO2008/039837
PCT Pub. Date: Apr. 3, 2008

(65) Prior Publication Data
US 2010/0114523 A1    May 6, 2010

Related U.S. Application Data

(60) Provisional application No. 60/857,244, filed on Nov. 7, 2006, provisional application No. 60/847,261, filed on Sep. 26, 2006.

(51) Int. Cl.
*G06F 15/00* (2006.01)
(52) U.S. Cl. .................................................... 702/151
(58) Field of Classification Search .................... 702/151
See application file for complete search history.

(56) References Cited

U.S. PATENT DOCUMENTS

| 4,800,974 | A | 1/1989 | Wand et al. |
| 5,930,905 | A | 8/1999 | Zabler et al. |
| 6,420,697 | B1 | 7/2002 | Donner et al. |
| 6,492,807 | B2 | 12/2002 | Spellman |
| 6,547,029 | B2 | 4/2003 | Peppler et al. |
| 6,630,823 | B2 | 10/2003 | Tateishi et al. |

OTHER PUBLICATIONS

Derk Jan Adelerhof, New position detectors based on AMR sensors, 2000 Elsevier Science S.A., p. 48-53.*

* cited by examiner

*Primary Examiner* — Tung S Lau
(74) *Attorney, Agent, or Firm* — Brinks Hofer Gilson & Lione

(57) ABSTRACT

A position sensor assembly for determining the absolute angular position of a motor vehicle steering wheel includes a housing, an input gear driven by a rotary input, and a pickup gear coupled to the input gear. A cam having a spiroidal profile is generated about the rotational axis of the input gear and is rotatable with the input gear. A cam follower is coupled with the housing and engages the spiroidal profile, wherein rotation of the spiroidal profile as the input gear turns causes the cam follower to move along the spiroidal profile. A first sensor is associated with the pickup gear such that rotation of the pickup gear provides an output signal from the first sensor. A second sensor is associated with the cam follower such that motion of the cam follower produces an output signal from the second sensor. A processor receives output signals from the first and second sensors to produce a signal proportional to the angular position of the input gear.

9 Claims, 4 Drawing Sheets

US 8,326,570 B2

STEERING WHEEL POSITION SENSOR

CROSS REFERENCE TO RELATED APPLICATIONS

This application claims priority to U.S. Provisional Patent Application No. 60/857,244, filed Nov. 7, 2006, U.S. Provisional Patent Application No. 60/847,261, filed Sep. 26, 2006, and PCT/US07/079522, filed Sep. 26, 2007.

FIELD OF THE INVENTION

This invention relates to a position sensor assembly and particularly to one providing both angular rate and absolute angular position measurements.

BACKGROUND OF THE INVENTION

The absolute angular position of a motor vehicle steering wheel, also referred to as the steering- or rotation-angle, is, for example, required for monitoring or controlling a vehicle dynamic control system. The dynamic control system evaluates the rotation-angle and converts it to various control actuators, such as the brakes. Other typical applications which use rotation-angle as an input include, for example, torque vectoring systems, yaw control systems, chassis controlled stability enhancement systems, electrically assisted power steering, steer-by-wire systems and navigation systems.

Steering wheel position sensors are used in automotive applications for electronic monitoring of steering functions of a motor vehicle. In particular, position sensors are used for determining the angular position of a steering shaft as a user turns a steering wheel. An example of a position sensor is disclosed in U.S. Pat. No. 5,930,905 (the "905 patent) to Zabler et al. The '905 patent discloses a gear having teeth coupled to a shaft. The teeth engage teeth disposed on a second gear and a third gear. The three gears have a different number of teeth. A pair of absolute position sensors is positioned in proximity to the second gear and the third gear for generating an output that corresponds to the angular positions of the gears. As long as the number of teeth on each of the gears is known, it is possible to calculate the angular position of the steering shaft based on the outputs of the absolute position sensors.

Although the above-mentioned position sensor assembly may be useful, it requires two fine accuracy rotary sensors, which are costly to manufacture and package (i.e., in the confines of a motor vehicle steering column). Other position sensor assemblies utilize a fine accuracy rotary sensor and a coarse sensor. However, these position sensor assemblies require the use of a mechanism that is large and cumbersome to package within the tight confines of a vehicle steering column.

In view of the above, there exists a need for an a improved, cost-efficient position sensor assembly which combines sensors to determine the angular rate as well as the absolute angular position of a motor vehicle steering wheel.

SUMMARY OF THE INVENTION

In satisfying the above need, as well as overcoming the enumerated drawbacks and other limitations of the related art, in a preferred embodiment the present invention utilizes both a fine accuracy rotary sensor and a coarse sensor to ascertain the absolute whole and fractional total revolutions of a rotary input which revolves multiple turns, such as that generated by a motor vehicle steering wheel. With an appropriate algorithm, it is possible to combine the fine accuracy sensor signal with the coarse sensor signal and produce an output signal that is proportional to the absolute rotations of the rotary input.

According to one embodiment of the invention, the position sensor assembly includes a housing comprising an input gear driven by a rotary input, such as a motor vehicle steering wheel, coupled to a pickup gear by means of conventional gear teeth. The position sensor assembly further comprises a permanent magnet fixed to the pickup gear such that the magnetic field of the magnet rotates with the pickup gear. A first position sensor, for example, using a Hall effect sensor, is located in close proximity to the magnet fixed to the pickup gear such that rotation of the magnet provides an output signal from the first position sensor. A cam having a spiroidal profile is generated about the rotational axis of the input gear and is rotatable with the input gear. A cam follower is coupled with the housing and engages the spiroidal profile, wherein rotation of the spiroidal profile as the input gear turns causes the cam follower to move along the spiroidal profile. The spiroidal profile has sufficient length to cause the input member to be rotated between its extreme "lock-to-lock" positions, from one end of travel to another. The position sensor assembly further comprises a second magnet movable with the cam follower and in close proximity to a second position sensor wherein motion of the cam follower produces an output signal from the second position sensor. A processor receives output signals from the position sensors to produce a signal related to the angular position of the input gear.

In the present invention, the rotary input is rotatable through a fixed number of rotations. For example, the rotary input may be from a source with a finite number of total revolutions, such as a vehicle steering wheel which has approximately five total revolutions from one end of travel to another.

In another embodiment of the present invention, the cam follower is part of a sliding member which is slidably attached to the housing, wherein the second magnet is carried by the sliding member and the second position sensor senses sliding motion of the sliding member.

In an alternative embodiment of the present invention, the cam follower is part of a pivoting arm which is pivotably attached to the housing, wherein the second magnet is carried by the pivoting arm and the second position sensor senses pivoting of the arm.

In preferred embodiments of the present invention, the input gear has a different number of gear teeth than the pickup gear, for example a gear ratio of 2:1.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
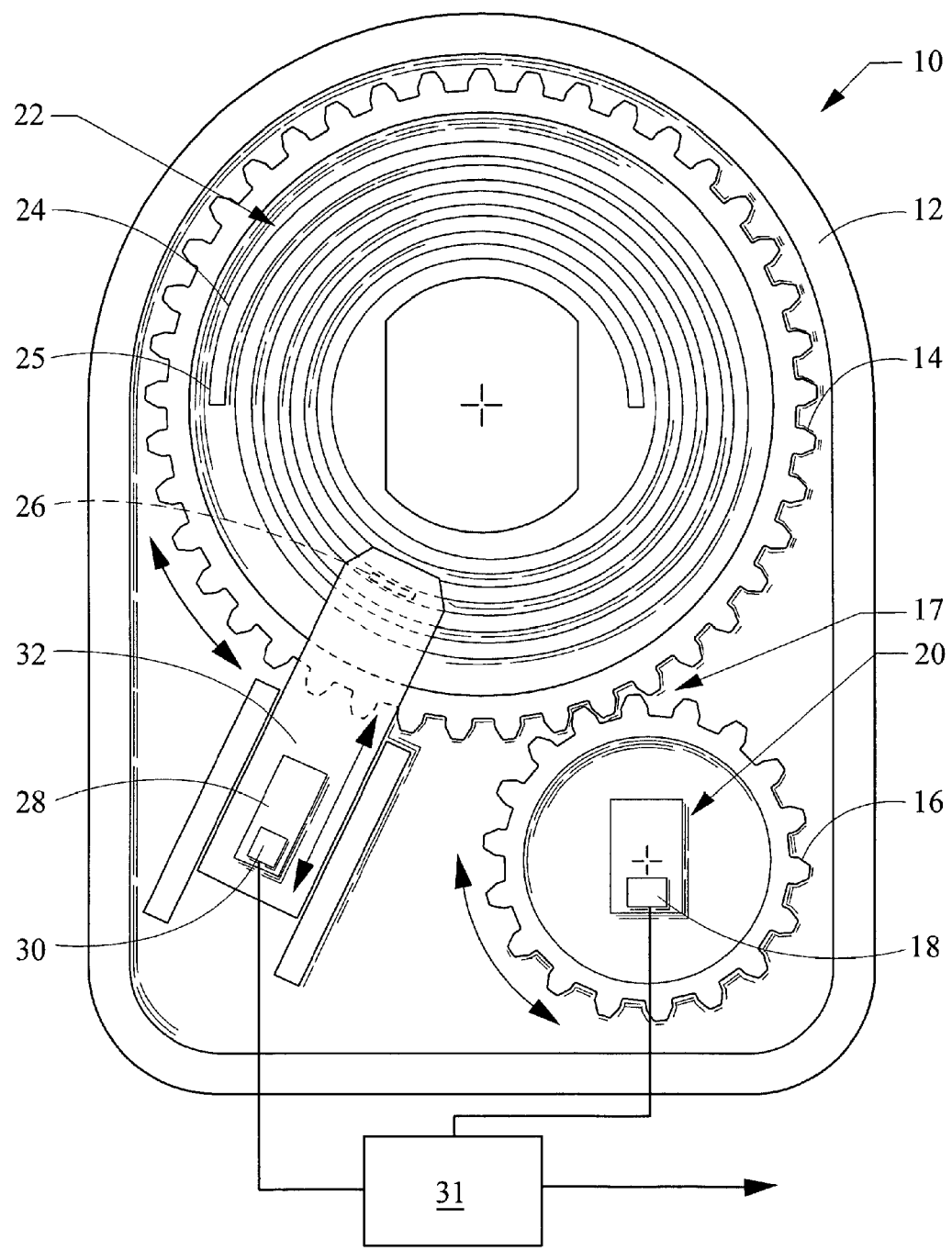
FIG. 1 is a top view of a position sensor assembly in accordance with a first embodiment of the present invention.
Figure 2:
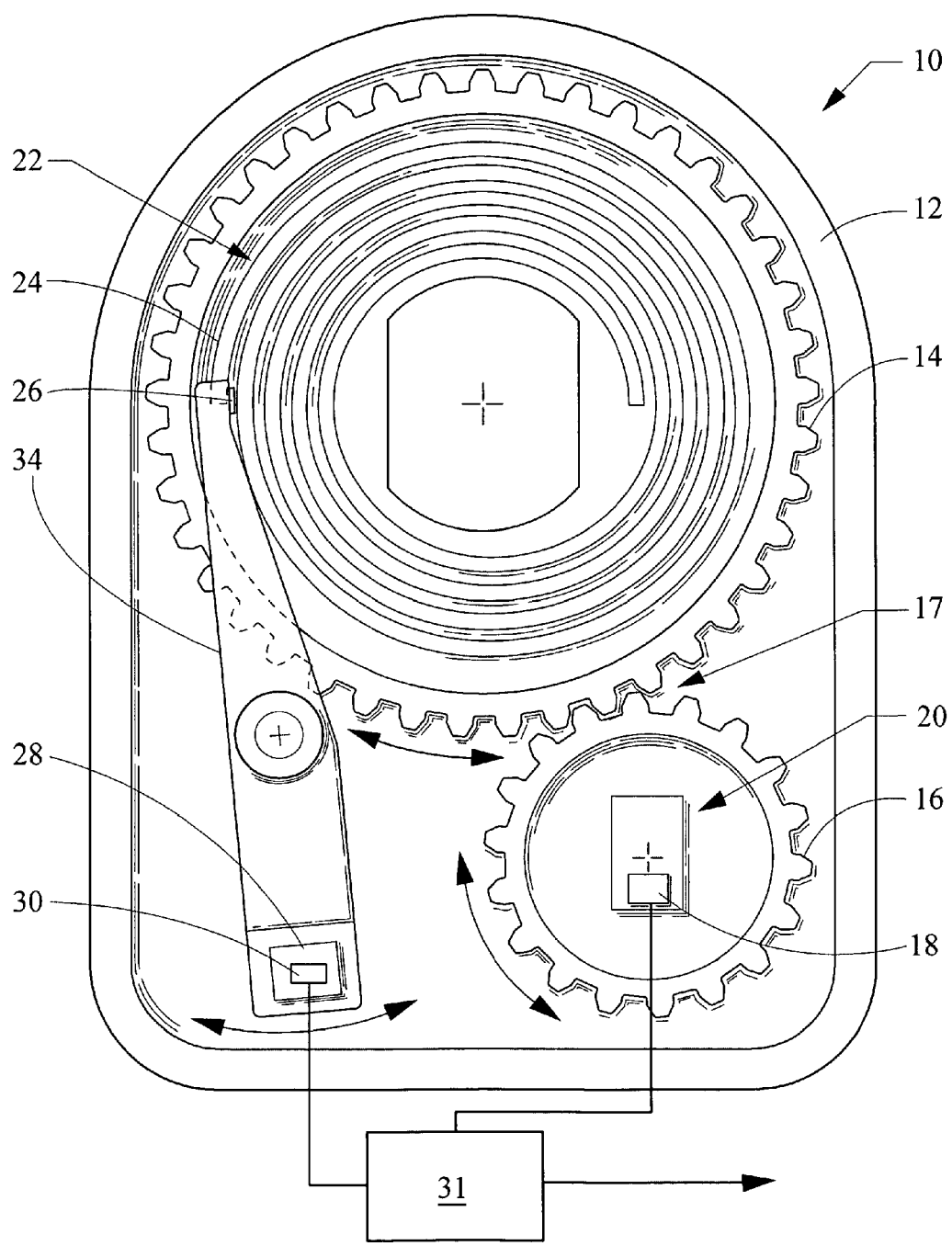
FIG. 2 is a top view of a position sensor assembly in accordance with a second embodiment of the present invention.

Referring now to FIG. 1 and FIG. 2, a position sensor assembly embodying the principles of the present invention is illustrated therein and designated at 10. The position sensor assembly 10 comprises a housing 12, and an input gear 14, driven by a rotary input from a source with a finite number of total revolutions, such as a motor vehicle steering wheel which typically has approximately five total revolutions per travel cycle. The input gear 14 is coupled to a pickup gear 16 by means of meshing gear teeth 17.

A first magnet 18 is fixed to pickup gear 16 such that the magnetic field rotates with pickup gear 16, and magnetized such that the N-S magnetic polarity is aligned perpendicular to the rotation axis of pickup gear 16 and first magnet 18. A first magnetic sensor 20, such as a Hall effect sensor, is located within housing 12, in close proximity to first magnet 18 such that rotation of first magnet 18 produces a signal from first sensor 20 that is proportional to the angle of rotation of pickup gear 16.

Located on input gear 14 is a cam 22 having a spiroidal profile 24, such as a wall 25 or groove, which rotates with input gear 14. The spiroidal profile 24 traces a continuous curve, similar in concept to grooves of a phonograph record. A cam follower 26 is coupled with housing 12 and engages the spiroidal profile 24 of cam 22. As input gear 14 turns, the rotation of the spiroidal profile 24 causes cam follower 26 to move along the spiroidal profile 24. The spiroidal profile 24 has sufficient length (i.e., measured if it is "unwound") to provide a unique position of cam follower 26 throughout the angular range of movement of input gear 14.

A second magnet 28 is located within housing 12 and is movable with cam follower 26. A second magnetic sensor 30, such as a Hall effect sensor, is located within housing 12 in close proximity to second magnet 28 such that motion of cam follower 26, and thus displacement of second magnet 28, produces an electrical signal from second sensor 30. The first and second sensors 20 and 30 may also include alternative sensing technology such as anisotropic magnetoresistive (AMR) sensors or giant magnetoresistive (GMR) sensors. A processor 31 or evaluation circuit receives electrical signals from first and second sensors 20 and 30, which provide sensitivity to small angular movements of the input gear. The processor 31 then produces a signal related to the absolute angular position of input gear 14.

FIG. 1 illustrates a first embodiment of a position sensor assembly 10 in accordance with the present invention wherein cam follower 26 is part of a sliding member 32 which is slidably attached to housing 12 such that the sliding member 32 is free to move along a linear path. The sliding member 32 has a pin or similar detail which is constrained to slidably engage the spiroidal profile 24 of cam 22 such that the rotation of input gear 14 and the spiroidal profile 24 causes the sliding member 32 to move along the path. The spiroidal profile 24 provides a unique position of the sliding member 32 through the complete rotational range of movement of input gear 14. A second magnet 28 is fixed to the sliding member 32 and a second sensor 30 is located in housing 12 in close proximity to second magnet 28 on the sliding member 32 such that motion of the sliding member 32, and thus displacement of second magnet 28, produces a signal from second sensor 30. A processor 31 or evaluation circuit receives signals from first and second sensors 20 and 30 and produces a signal related to the angular position of input gear 14.

FIG. 2 illustrates a second embodiment of a position sensor assembly 10 in accordance with the present invention wherein cam follower 26 is part of a pivoting arm 34 which is pivotably attached to housing 12. The pivoting arm 34 is constrained near its center to pivot on housing 12 such that the first end of the pivoting arm 34 is constrained to slidably engage the spiroidal profile 24 such that rotation of input gear 14 and the spiroidal profile 24 causes the second end of pivoting arm 34 to rotate through an arc segment. A second magnet 28 is fixed to the pivoting arm 34 and a second sensor 30 is located in housing 12 in close proximity to second magnet 28 on the pivoting arm 34 such that motion of the pivoting arm 34, and this displacement of second magnet 28, produces a signal from second sensor 30. A processor 31 or evaluation circuit receives signals from first and second sensors 20 and 30 and produces a signal related to the angular position of input gear 14.

In both embodiments illustrated in FIGS. 1 and 2, as input gear 14 is rotated, pickup gear 16 rotates at a period proportional to the gear ratio between the input gear 14 and pickup gear 16. For example, a ratio of 2:1 means that for each rotation of the input gear 14, the pickup gear 16 rotates two rotations. Other gear ratios can be provided.

Figure 3:
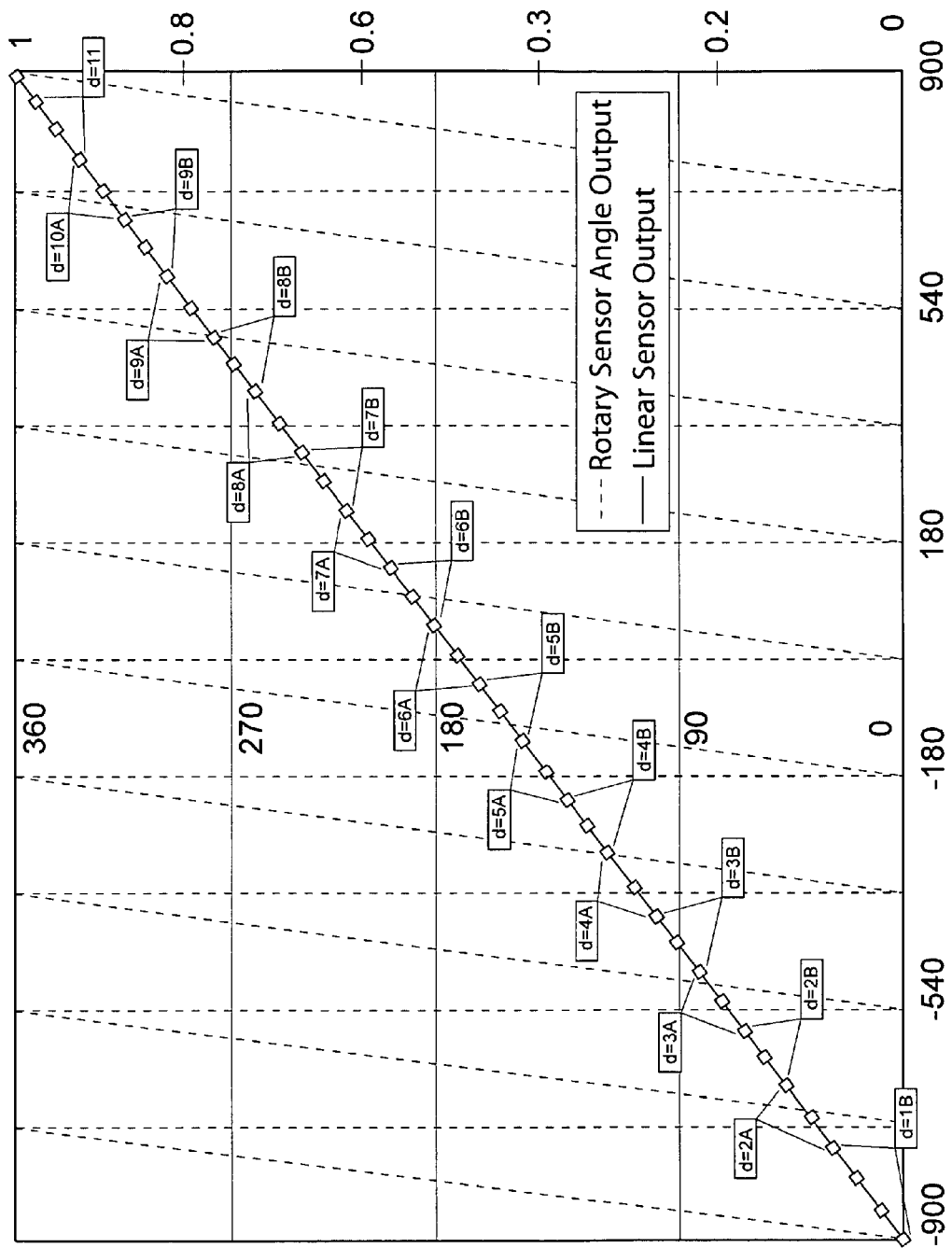
FIG. 3 is a graph illustrating output waveforms detected by the position sensor assembly of the present invention over a range of five revolutions.
Figure 4:
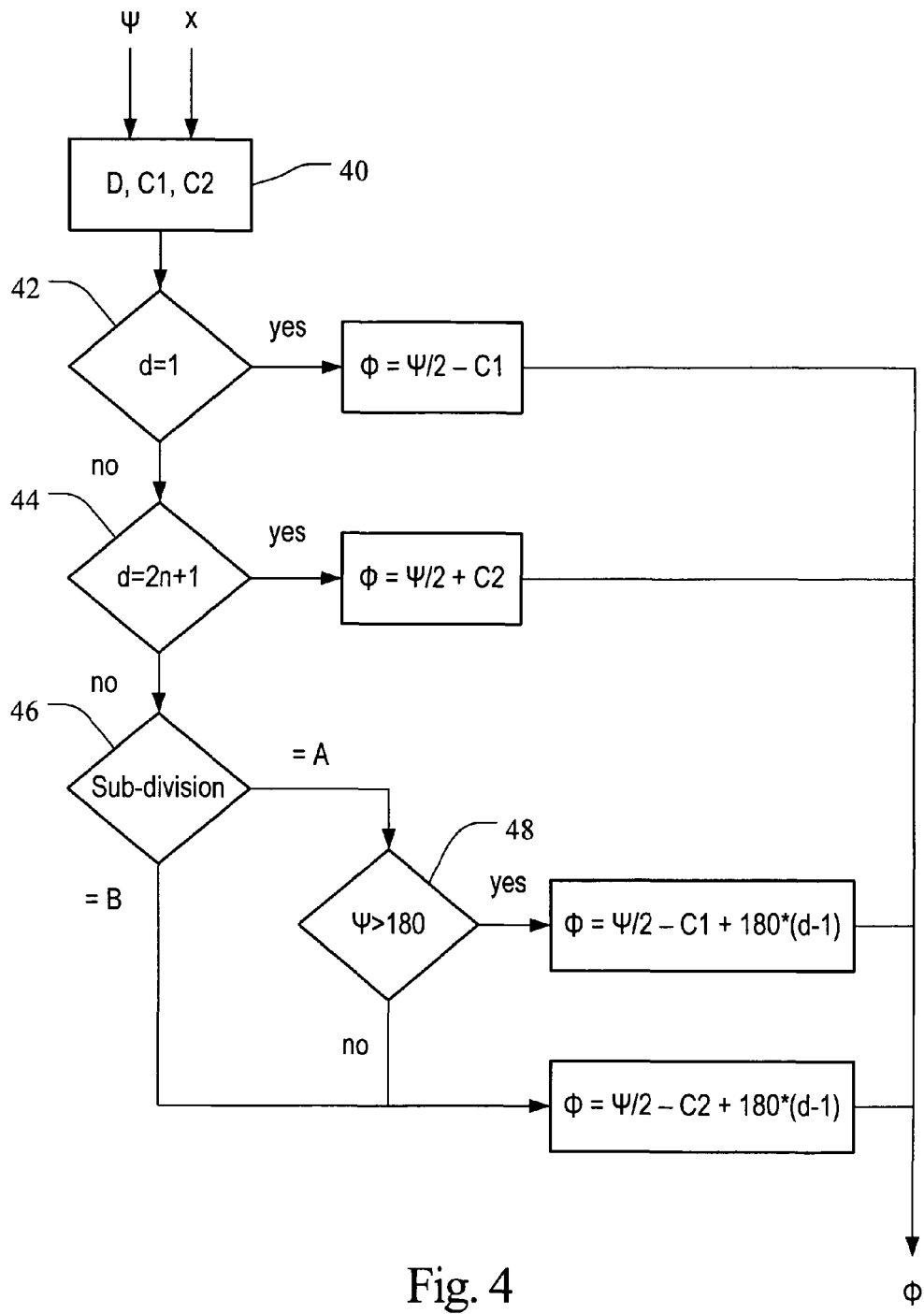
FIG. 4 is a flow chart of the computation of the algorithm used to calculate the absolute rotation angle of the input gear.

FIGS. 3 and 4 represent a method of calculating the absolute rotation angle ($\phi$) of a motor vehicle steering wheel using the position sensor assembly 10 of the present invention. FIG. 3 is a graph of output signals detected by the position sensor assembly 10 of FIG. 1 or FIG. 2. The plot labeled "Rotary Sensor Angle Output" represents the rotation angle ($\psi$) of the first sensor 20 (and pickup gear 16) as a function of the fixed number of degrees of rotation of the input gear 14, where the fixed number of degrees of rotation of the input gear 14 is equal to the fixed number of rotations (n) of the input gear 14 multiplied by 360°. The plot labeled "Linear Sensor Output" represents the normalized output (x) of the second sensor 30 as a function of the fixed number of degrees of rotation) (n*360°) of the input gear 14, in either the embodiment shown in FIG. 1, wherein the second sensor 30 is adapted to produce an output signal derived from the linear sliding motion of the sliding member 32, or the embodiment shown in FIG. 2, wherein the second sensor 30 is adapted to produce an output signal derived from the rotating pivoting motion of the pivoting arm 34.

The rotary sensor angle output has a number of periods equal to the fixed number of rotations (n) multiplied by the gear ratio. The gear ratio is the number of rotations of the pickup gear 16 for each rotation of the input gear 14. The periods are divided into segments and the segments are grouped into divisions, d=1 through d=2n+1, wherein divisions d=2 through d=2n are partitioned into equal sized portions having first and second sub-labels. Each division (d) is associated with a specific range of the normalized output (x) of the second sensor 30.

The embodiment of the position sensor assembly 10 illustrated in FIG. 3 has a 2:1 gear ratio, over a range of five fixed rotations (n=5) of the input gear 14 and therefore 1800° degrees of rotation, shown as −900° to +900° on the horizontal axis. The plot illustrates that over the five rotations of the input gear 14, the rotary sensor angle output cycles through ten periods, while the linear sensor output smoothly increases from a normalized value of zero to one. Each period of the rotary sensor output is divided into four segments. For the embodiment in FIG. 3, there are 40 total segments over the full range of input gear rotations. These segments are then grouped into divisions that are used to determine the proper offset to add or subtract to the rotary sensor output to determine the absolute angle ($\phi$) of the input gear 14. The segments are grouped into divisions d=1 through d=11, wherein divisions d=2 through d=10 are partitioned into equal sized portions, designated by sub-labels "A" and "B". By partitioning the output voltage of second sensor 30 in this manner, the logic illustrated in the flowchart (FIG. 4) can be used to determine an appropriate offset to be added or subtracted to the output signal of first sensor 20 to account for the number of complete rotations the input gear 14 has made from initial center.

Once (x) is determined, the rotary sensor angle output and linear sensor output are used to determine the division (d) to which (x) is located. If d=2 through d=2n, the sub-level must be determined. After determining the division (d) to which (x) is located, as well as the rotation angle ($\psi$) of the first sensor 20, the algorithm of FIG. 4 is used to calculate the absolute rotation angle ($\phi$) of the motor vehicle steering wheel. When d=1, the absolute rotation angle ($\phi$) is determined by the equation $\phi=\psi/2-C1$, wherein $C1=(360°*n)/2$. When d=2n+1, the absolute rotation angle ($\phi$) is determined by the equation $\phi=\psi/2+C2$, wherein $C2=C1-180°$. When d=2 through d=2n, and when the sub-label is the second sub-label, the absolute rotation angle ($\phi$) is determined by the equation $\phi=\psi/2-C2+180°*(d-1)$. When d=2 through d=2n, and when the sub-label is the first sub-label, and when $\psi$ is less than 180°, the absolute rotation angle ($\phi$) is determined by the equation $\phi=\psi/2-C2+180°*(d-1)$. Finally, when d=2 through d=2n, and when the sub-label is the first sub-label, and when $\psi$ is greater than 180°, the absolute rotation angle ($\phi$) is determined by the equation $\phi=\psi/2-C1+180°*(d-1)$.

For example, the computation of the algorithm used to calculate the absolute rotation angle ($\phi$) of the input gear 14, given the rotation angle ($\psi$) of first sensor 20 (0° to 360°) and the normalized travel (x) of the second sensor 30, is illustrated in FIG. 4. The example in FIG. 4 is based on the embodiment represented in FIG. 3, the position sensor assembly 10 having a 2:1 gear ratio and a fixed number (n) of five rotations of the input gear 14 and therefore 1800° degrees of rotation. The first Step 40 is to determine the value of (d), the division number into which (x) is located (1 to 2n+1), which is determined from the first and second output signals. The second Step 42 is to inquire as to whether d=1. If the answer is yes, then the absolute rotation angle $\phi$ is determined by $\phi=\psi/2-900°$ (where $C1=(360°*5)/2=900°$. Alternatively, if the answer at Step 42 is no, then the algorithm moves forward to Step 44 and inquires as to whether d=11 (where d=2n+1=2(5)+1). If the answer is yes, then the absolute rotation angle ($\phi$) is determined by $\phi=\psi/2+720°$ (where $C2=C1-180°=900°-180°=720°$). However, if the answer at Step 44 is no, then the algorithm moves forward to Step 46 and inquires as to whether the sub-division of (d) is "A" or "B." If the sub-division of (d) is "B," then $\phi$ is determined by $\phi=\psi/2-720°+180°*(d-1)$. However, if the sub-division of d is "A," then the algorithm moves forward to Step 48 and inquires as to whether $\psi$ is greater than 180°. If the answer is yes and $\psi$ is greater than 180°, then $\phi$ is determined by $\phi=\psi/2-900°+180°*(d-1)$. Alternatively, if the answer is no and $\psi$ is less than 180°, then $\phi$ is determined by $\phi=\psi/2-720°+180°*(d-1)$.

The algorithm is robust against a phase error between the linear sensor output and the angular sensor output of up to +/-90° of rotation of the pickup gear 16.

Although second sensor 30 by itself generates a signal that is indicative of the absolute rotation angle ($\phi$) of the input gear 14, the resolution that is practical to obtain from such a device is insufficient for most applications for the overall sensor assembly. Thus, by coupling a fine accuracy first sensor 20 with a relatively coarse second sensor 30, the present invention is able to achieve the desired fine level of accuracy at an economic advantage over prior art designs which must employ two fine accuracy rotary sensors. Furthermore, overall size of the housing needed by the invention to house the mechanism is substantially smaller than prior art designs which also use a single fine accuracy rotary sensor and a coarse accuracy sensor, thereby providing a distinct advantage for end users to fit the sensor within their assembly.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A position sensor assembly for determining an angular position of a motor vehicle steering wheel rotatable through a fixed number of revolutions from one end of travel to another, the position sensor assembly comprising:
   a housing;
   an input gear supported by the housing, the input gear driven by rotations of the steering wheel through angular positions over the fixed number of revolutions;
   a pickup gear supported by the housing, the pickup gear being coupled to the input gear by means of meshing gear teeth;
   a first position sensor and a first magnet associated with the pickup gear, wherein the first magnet forms a magnetic interaction with the first position sensor such that rotation of the pickup gear provides an output signal from the first position sensor;
   a cam having a spiroidal profile generated about the rotational axis of the input gear and rotatable with the input gear;
   a cam follower supported by the housing and engaging the spiroidal profile, wherein rotation of the spiroidal profile as the input gear turns causes the cam follower to move to a unique position for each angular position over the fixed number of revolutions;
   a second position sensor and a second magnet associated with the cam follower, wherein the second magnet forms a magnetic interaction with the second position sensor such that motion of the cam follower provides an output signal from the second position sensor; and
   a processor for receiving output signals from the first and second position sensors to produce a signal related to the angular position of the input gear.

2. A position sensor assembly in accordance with claim 1 wherein the cam follower is part of a sliding member which is slidably attached to the housing.

3. A position sensor assembly in accordance with claim 2 wherein the second magnet is carried by the sliding member and the second position sensor senses sliding motion of the sliding member.

4. A position sensor assembly in accordance with claim 1 wherein the cam follower is part of pivoting arm which is pivotably attached to the housing.

5. A position sensor assembly in accordance with claim 4 wherein the second magnet is carried by the pivoting arm and the second position sensor senses pivoting of the arm.

6. A position sensor assembly in accordance with claim 1 wherein the first and second position sensors are Hall effect sensors.

7. A position sensor assembly in accordance with claim 1 wherein the input gear has a first number of gear teeth and the pickup gear has a second number of gear teeth, the first number of gear teeth being different than the second number of gear teeth.

8. A position sensor assembly in accordance with claim 7 wherein the first number of gear teeth is greater than the second number of gear teeth.

9. A position sensor assembly in accordance with claim 1, wherein the processor uses the output signals from the first and second position sensors to calculate the absolute rotation angle ($\phi$) of a motor vehicle steering wheel, wherein the calculation comprises the steps of:

mapping the first and second output signals over the fixed number of revolutions of the input gear, wherein (n) represents the fixed number of revolutions of the input gear, wherein the first output signal is provided by the first position sensor having a rotation angle ($\psi$), the first output signal having a number of periods equal to the fixed number of revolutions of the input gear (n) multiplied by the gear ratio, wherein the gear ratio is the number of revolutions of the pickup gear for each revolution of the input gear, wherein the first output signal represents the rotation angle ($\psi$) of the first position sensor as a function of degrees of rotation of the input gear, wherein the second output signal is provided by the second position sensor, wherein the second output signal represents a normalized output (x) of the second position sensor as a function of degrees of rotation of the input gear;

dividing each period of the first output signal into divisions d=1 through d=2n+1, wherein divisions d=2 through d=2n are partitioned into equal sized portions having a first and a second sub-label, wherein each division (d) is associated with a specific range of the second output signal (x);

determining the rotation angle ($\psi$) of the first position sensor;

determining the normalized output (x) of the second position sensor;

determining (d) associated with (x) from the second output signal;

determining whether the sub-label is the first or the second sub-label when d=2 through d=2n, wherein the absolute rotation angle ($\phi$) is determined by the equation:

$\phi=\psi/2-C1$ when d=1, wherein C1 is equal to $(360°*n)/2$;

$\phi=\psi/2+C2$ when d=2n+1, wherein C2 is equal to $C1-180°$;

$\phi=\psi/2-C2+180°*(d-1)$ when d=2 through d=2n, and when the sub-label is the second sub-label;

$\phi=\psi/2-C2+180°*(d-1)$ when d=2 through d=2n, and when the sub-label is the first sub-label, and when $\psi$ is less than 180°; and $\phi=\psi/2-C1+180°*(d-1)$ when d=2 through d=2n, and when the sub-label is the first sub-label, and when $\psi$ is greater than 180°.

* * * * *